United States Patent [19]

Isoda

[11] Patent Number: 5,517,248

[45] Date of Patent: May 14, 1996

[54] FRAME-FREQUENCY CONVERTING APPARATUS FOR A VIDEO SIGNAL RESULTING FROM 2-3 CONVERSION OF ORIGINAL PICTURE INFORMATION

[75] Inventor: Kiyoyuki Isoda, Yokohama, Japan

[73] Assignee: Victor Company of Japan, Ltd., Yokohama, Japan

[21] Appl. No.: 451,315

[22] Filed: May 26, 1995

[30] Foreign Application Priority Data

May 31, 1994 [JP] Japan .................................... 6-141016

[51] Int. Cl.$^6$ ..................................................... H04N 7/01
[52] U.S. Cl. ........................................... 348/459; 348/441
[58] Field of Search .................................... 348/459, 911, 348/97, 441; H04N 7/01

[56] References Cited

U.S. PATENT DOCUMENTS

| | | | |
|---|---|---|---|
| 5,115,311 | 5/1992 | Jaqua | 348/911 X |
| 5,260,787 | 11/1993 | Capitant et al. | 348/459 |
| 5,353,119 | 10/1994 | Dorricott et al. | 348/459 |
| 5,428,399 | 6/1995 | Robinson et al. | 348/911 X |

OTHER PUBLICATIONS

Coding of Moving Pictures and Associated Audio for Digital Storage Media At Up to About 1.5 Mbit/s, 2–11172 Rev 1, pp. 2, 3, D7, D8, D9, Jan. 1992.

*Primary Examiner*—Victor R. Kostak
*Attorney, Agent, or Firm*—Lowe, Price, LeBlanc & Becker

[57] ABSTRACT

A frame-frequency converting apparatus acts on an input video signal resulting from 2–3 conversion of original picture information. Fields represented by the input video signal are rearranged, and thereby the input video signal is converted into a rearrangement-resultant video signal. Every pair of an odd field and a subsequent even field represented by the rearrangement-resultant video signal originate from a same frame represented by the original picture information. The rearrangement-resultant video signal is processed into a combination-resultant video signal, and specifically every pair of an odd field and a subsequent even field represented by the rearrangement-resultant video signal are combined into a frame represented by the combination-resultant video signal. Frames represented by the combination-resultant video signal are thinned out, and thereby the combination-resultant video signal is converted into a conversion-resultant video signal which has a predetermined frame frequency.

2 Claims, 13 Drawing Sheets

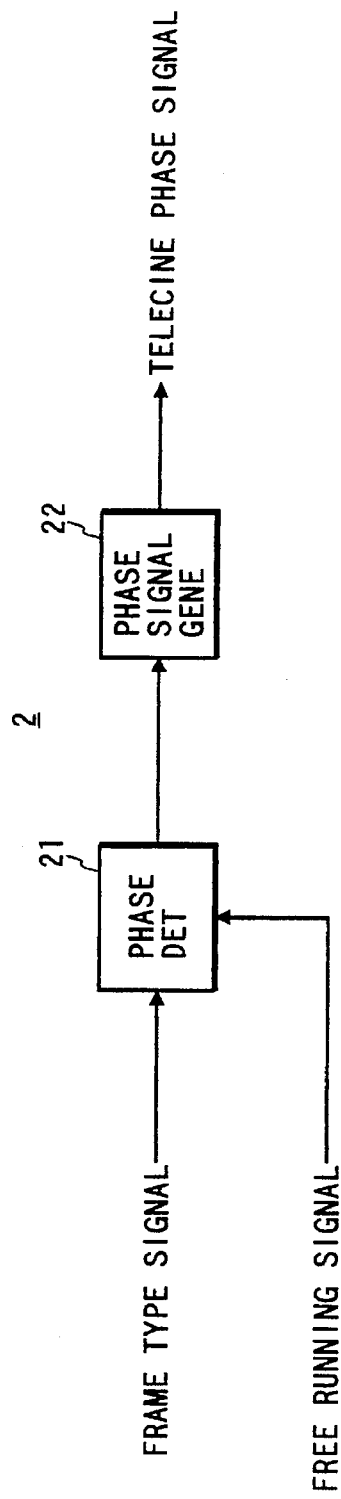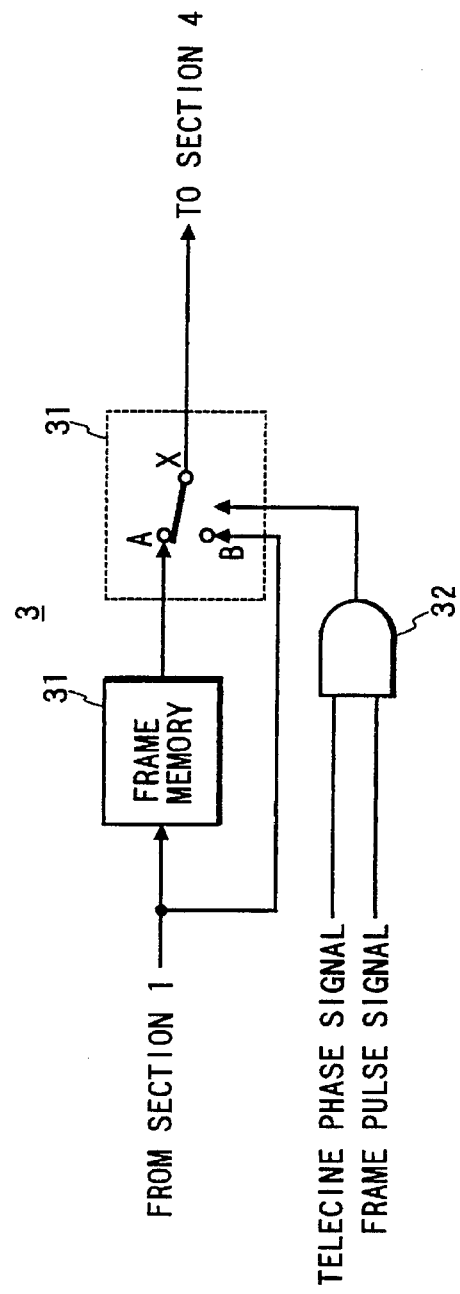

FIG. 8(A) 2-3 CONVERSION RESULT SIGNAL

FIG. 8(B) FRAME TYPE SIGNAL

FIG. 8(C) FREE RUNNING SIGNAL

FIG. 8(D) TELECINE PHASE DETECTION

FIG. 8(E) TELECINE PHASE SIGNAL

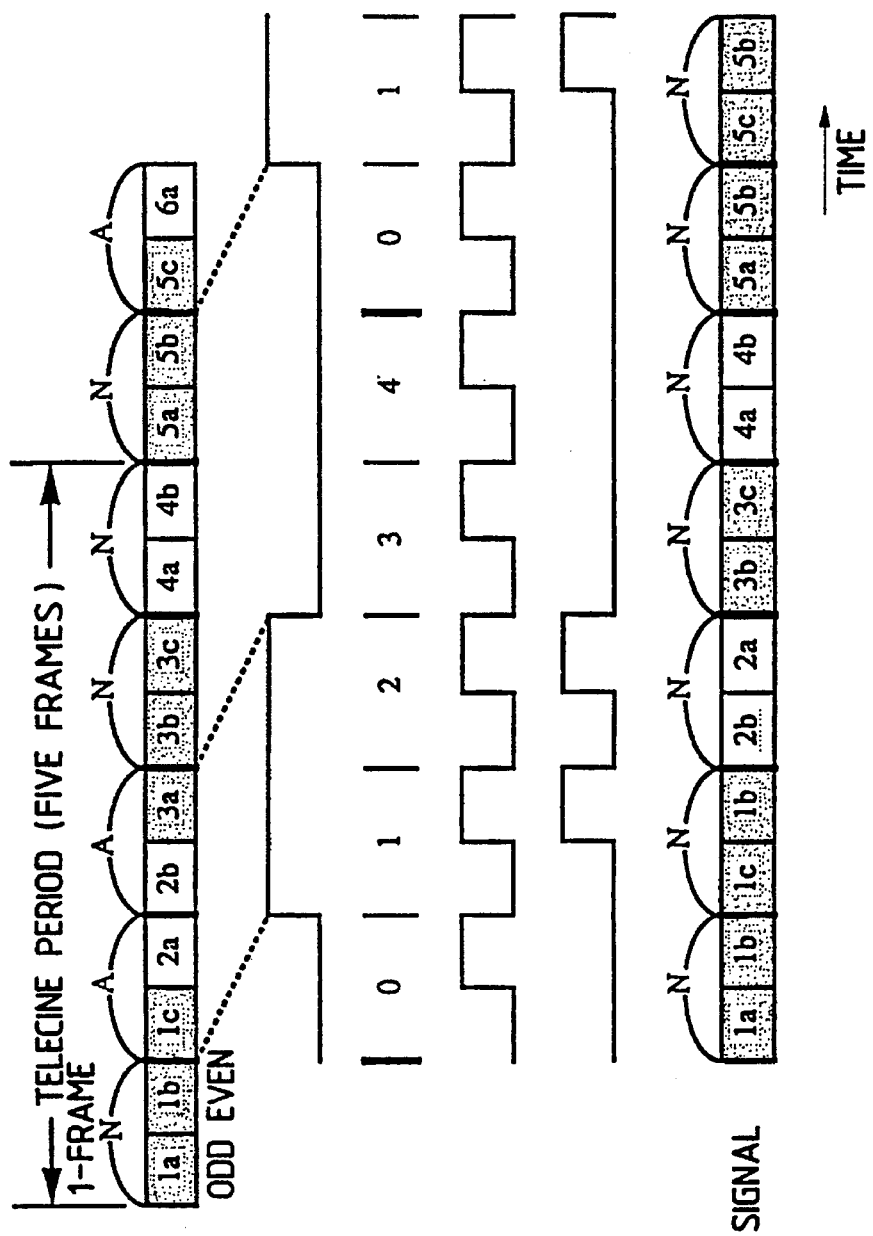

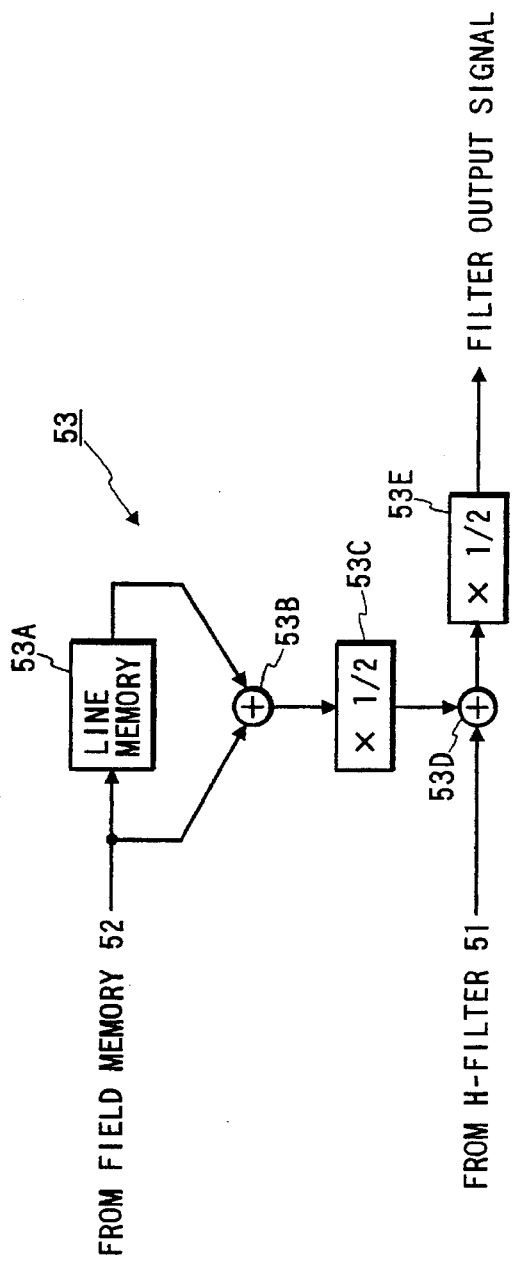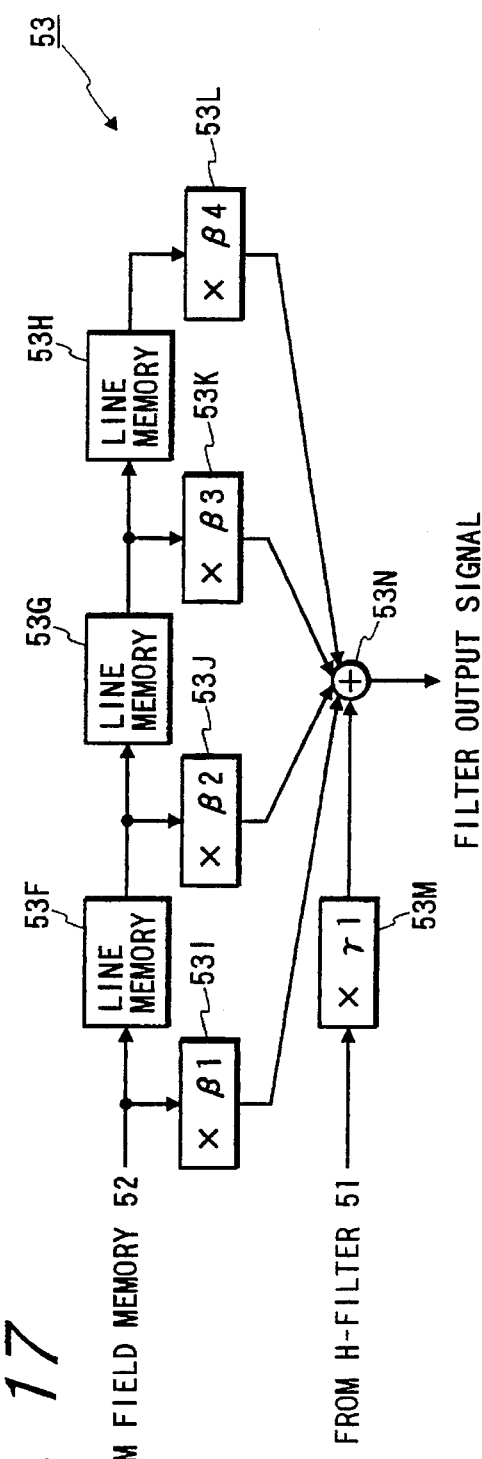
FIG. 16
FIG. 17

FRAME-FREQUENCY CONVERTING APPARATUS FOR A VIDEO SIGNAL RESULTING FROM 2-3 CONVERSION OF ORIGINAL PICTURE INFORMATION

BACKGROUND OF THE INVENTION

1. Field of the Invention

This invention relates to a frame-frequency converting apparatus for processing a video signal which results from 2–3 conversion of a film picture (a motion picture).

2. Description of the Prior Art

The NTSC television system has a rate of 29.97 frames (59.94 fields) per second. A standard motion picture has a rate of 24 frames per second. In general, 2–3 conversion is used to convert a motion picture into an NTSC video signal.

According to 2–3 conversion, one frame of a motion picture is changed into two successive fields related to an NTSC video signal, and a next frame of the motion picture is converted into next three successive fields related to the NTSC video signal.

Video CD's are optical disks on which moving-image information and audio information are recorded. Generally, an original video signal and an original audio signal are processed by highly-efficient encoding before being recorded on a video CD. The standards of video CD's provide a plurality of picture rates including a picture rate of 29.97 frames per second and a picture rate of 23.976 frames per second.

An NTSC video signal can be converted into a signal suited for recording on a video CD. In the case of an NTSC video signal resulting from 2–3 conversion of a motion picture, only every other field represented by the NTSC video signal is used in a signal recorded on a video CD. In this case, a video CD player reproduces two successive fields from every frame represented by the signal read out from the video CD. There periodically occur four successive fields (two successive frames) reproduced by the video CD player which originate from a same frame of the motion picture. The occurrence period agrees with a period of five frames of the motion picture. This phenomenon causes jitter in motion of images reproduced by the video CD player.

SUMMARY OF THE INVENTION

It is an object of this invention to provide an improved frame-frequency convening apparatus.

This invention provides a frame-frequency converting apparatus for an input video signal resulting from 2–3 conversion of original picture information which comprises means for rearranging fields represented by the input video signal, and thereby converting the input video signal into a rearrangement-resultant video signal, wherein every pair of an odd field and a subsequent even field represented by the rearrangement-resultant video signal originate from a same frame represented by the original picture information; means for processing the rearrangement-resultant video signal into a combination-resultant video signal, and specifically combining every pair of an odd field and a subsequent even field represented by the rearrangement-resultant video signal into a frame represented by the combination-resultant video signal; and means for thinning out frames represented by the combination-resultant video signal, and thereby converting the combination-resultant video signal into a conversion-resultant video signal which has a predetermined frame frequency.

The frame-frequency converting apparatus may further comprise means for detecting a change in a scene represented by the input video signal; means for estimating an even field from an immediately preceding odd field represented by the rearrangement-resultant video signal through an interpolation process when the change in the scene is detected by the detecting means; and means for replacing an actual even field represented by the rearrangement-resultant video signal with the even field estimated by the estimating means.

BRIEF DESCRIPTION OF THE DRAWINGS

FIG. 7 is a block diagram of a telecine phase generating section in the apparatus of FIG. 2.

FIG. 8 is a time-domain diagram of signals in connection with the telecine phase generating section of FIG. 7.

FIG. 9 is a block diagram of a field correcting section in the apparatus of FIG. 2.

FIG. 10 is a time-domain diagram of signals in connection with the field correcting section of FIG. 9.

FIG. 16 is a block diagram of a first example of a frame vertical filter in the filtering and combining section of FIG. 15.

FIG. 17 is a block diagram of a second example of the frame vertical filter in the filtering and combining section of FIG. 15.

DESCRIPTION OF THE PREFERRED EMBODIMENT

Figure 1:
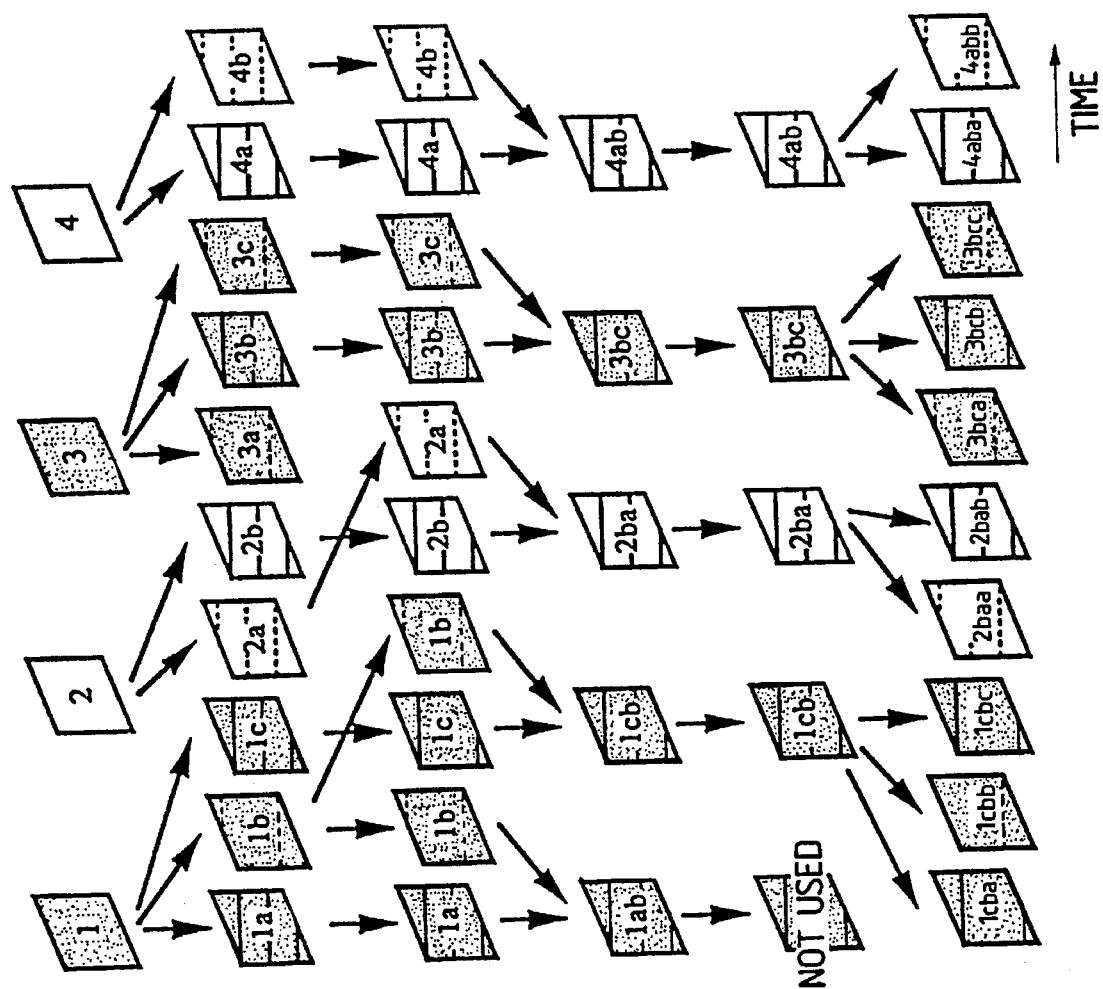
FIG. 1 is a time-domain diagram of frames and fields related to a motion picture and various video signals in connection with an embodiment of this invention.

With reference to FIG. 1, basic operation of a frame-frequency converting apparatus of an embodiment of this invention will now be described. As shown in the portion (A) of FIG. 1, a film picture (a motion picture) has a sequence of frames "1", "2", "3", "4", . . . .

As shown in the portions (A) and (B) of FIG. 1, the motion picture is changed into a first NTSC video signal by 2–3 conversion. According to the 2–3 conversion, one frame of the motion picture is changed into two successive fields represented by the first NTSC video signal, and a next frame of the motion picture is converted into next three successive fields represented by the first NTSC video signal. For example, the frame "2" of the motion picture is changed into two successive fields "2a" and "2b" related to the first NTSC video signal while the frame "3" of the motion picture is converted into next three successive fields "3a", "3b", and "3c" related to the first NTSC video signal.

As shown in the portions (B) and (C) of FIG. 1, the first NTSC video signal is converted into a second NTSC video signal by a field rearranging process. Specifically, fields represented by the first NTSC video signal are rearranged so that every pair of successive odd and even fields regarding the second NTSC video signal will originate from a same frame of the motion picture. For example, the field "1b" related to the first NTSC video signal is copied and the copy-resultant field "1b" is moved to a temporal position of the field "2a" to replace the latter while the field "2a" related to the first NTSC video signal is moved to a temporal position for the field "3a" so that the field "2a" replaces the field "3a".

As shown in the portions (C) and (D) of FIG. 1, the second NTSC video signal (the rearragement-resultant video signal) is converted into an intermediate video signal by a field combining process including a band limiting process. Specifically, every pair of successive odd and even fields represented by the second NTSC video signal are combined into a frame related to the intermediate video signal. For example, the fields "1a" and "1b" represented by the second NTSC video signal are combined into a frame "1ab" related to the intermediate video signal. As shown in the portion (D) of FIG. 1, there periodically occur two successive frames (for example, the frames "1ab" and "1cb") regarding the intermediate video signal which originate from a same frame (for example, the frame "1") of the motion picture. In other words, a set of two successive duplicate frames periodically occur with respect to the intermediate video signal.

As shown in the portions (D) and (E) of FIG. 1, the intermediate video signal is converted into a conversion-result video signal by a frame thinning process. Specifically, a former one (for example, the field "1ab") of two successive duplicate frames represented by the intermediate video signal is discarded while latter one (for example, the field "1cb") of the two successive duplicate frames is used in the conversion-result video signal. The conversion-result video signal can be recorded on a video CD.

The conversion-result video signal is indirectly or directly transmitted to a video CD player. As shown in the portions (E) and (F) of FIG. 1, the conversion-result video signal is changed into a video CD signal by 2–3 conversion in the video CD player. According to the 2–3 conversion, one frame represented by the conversion-result video signal is changed into two successive fields related to the video CD signal, and a next frame represented by the conversion-result video signal is converted into the next three successive fields related to the video CD signal. For example, the frame "2ba" represented by the conversion-result video signal is changed into two successive fields "2baa" and "2bab" related to the video CD signal while the frame "3bc" represented by the conversion-result video signal is converted into the next three successive fields "3bca", "3bcb", and "3bcc" related to the video CD signal. The video CD player reproduces images represented by the video CD signal.

Figure 2:
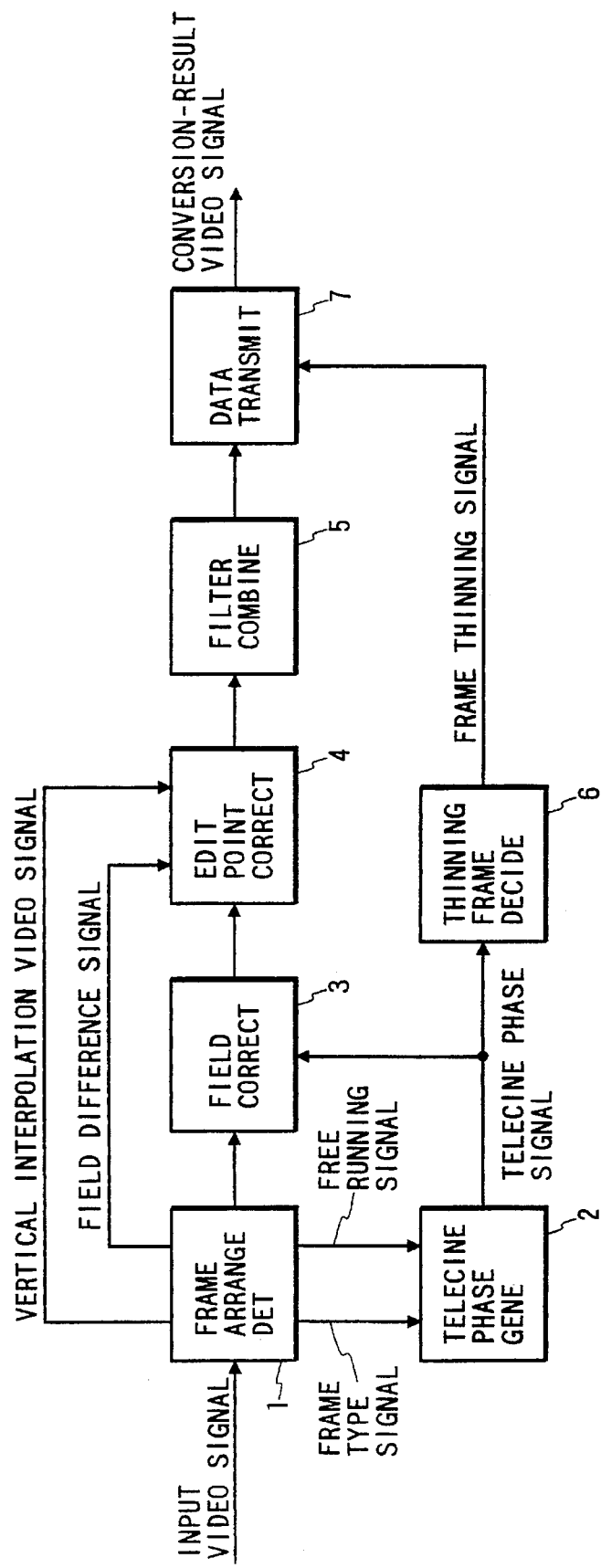
FIG. 2 is a block diagram of a frame-frequency converting apparatus according to the embodiment of this invention.

With reference to FIG. 2, the frame-frequency converting apparatus receives an input video signal, and changes the input video signal into a conversion-result video signal. The frame-frequency converting apparatus outputs the conversion-result video signal. The input video signal received by the frame-frequency converting apparatus agrees with a first NTSC video signal which results from 2–3 conversion of a motion picture. As shown in the portion (B) of FIG. 1, frames represented by the input video signal (that is, the first NTSC video signal resulting from 2–3 conversion of the motion picture), are divided into groups each having five successive frames (ten successive fields). Thus, the input video signal has a 5-frame period which is referred to as a telecine period.

Regarding the input video signal, frames are classified into two types. Every first-type frame is composed of two fields originating from a same frame of the motion picture. The first-type frame is referred to as a regular frame or a normal frame. Every second-type frame is composed of two fields originating from different frames of the motion picture respectively. The second-type frame is referred to as an irregular frame or an abnormal frame. As understood from the portions (A) and (B) of FIG. 1, during every telecine period, there are three normal frames and two abnormal frames.

With reference back to FIG. 2, the frame-frequency converting apparatus includes a frame arrangement detecting section 1, a telecine phase generating section 2, a field correcting section 3, an editing point correcting section 4, a filtering and combining section 5, a disregarded frame deciding section 6, and a data transmitting section 7.

The frame arrangement detecting section 1 receives the input video signal. The frame arrangement detecting section 1 is connected to the telecine phase generating section 2, the field correcting section 3, and the editing point correcting section 4. The telecine phase generating section 2 is connected to the field correcting section 3 and the disregarded frame deciding section 6. The field correcting section 3 is connected to the editing point correcting section 4. The editing point correcting section 4 is connected to the filtering and combining section 5. The filtering and combining section 5 is connected to the data transmitting section 7. The disregarded frame deciding section 6 is connected to the data transmitting section 7. The data transmitting section 7 outputs the conversion-result video signal.

The frame arrangement detecting section 1 detects the type of the arrangement of frames represented by the input video signal, and generates a signal (a frame type signal) indicating the detected type of the frame arrangement. The frame arrangement detecting section 1 outputs the frame type signal to the telecine phase generating section 2.

The frame arrangement detecting section 1 decides the reliability of the frame type signal. Specifically, the frame arrangement detecting section 1 determines whether or not the reliability of the frame type signal is lower than a predetermined reference reliability. When the reliability of the frame type signal is lower than the predetermined reference reliability, the frame arrangement detecting section 1 generates an active free running signal and outputs the active free running signal to the telecine phase generating section 2. Otherwise, the frame arrangement detecting section 1 generates an inactive free running signal and outputs the inactive free running signal to the telecine phase generating section 2.

To provide the synchronization between processed signals, the frame arrangement detecting section 1 delays the input video signal and outputs a delay-resultant video signal to the field correcting section 3.

The frame arrangement detecting section 1 generates a vertical interpolation video signal and a field difference signal from the input video signal, and outputs the vertical interpolation video signal and the field difference signal to the editing point correcting section 4.

The telecine phase generating section 2 receives the frame type signal and the free running signal from the frame arrangement detecting section 1. While the free running signal remains inactive, the telecine phase generating section 2 continues to detect a telecine phase by referring to the frame type signal. The telecine phase generating section 2 produces a signal (a telecine phase signal) representing the detected telecine phase, and outputs the produced telecine phase signal to the field correcting section 3 and the disregarded frame deciding section 6. When the free running signal changes from the inactive state to the active state, the telecine phase generating section 2 suspends the detection of the telecine phase. After the free running signal changes to the active state, the telecine phase generating section 2 produces a telecine phase signal on the basis of the last detected telecine phase. The produced telecine phase signal has a period (a 5-frame period) corresponding to five successive frames related to the input video signal. The telecine phase generating section 2 outputs the produced telecine phase signal to the field correcting section 3 and the disregarded frame deciding section 6.

The field correcting section 3 receives the delay-resultant video signal from the frame arrangement detecting section 1. Frames or fields represented by the delay-resultant video signal are arranged as shown in the portion (B) of FIG. 1. The field correcting section 3 receives the telecine phase signal from the telecine phase generating section 2. As shown in the portions (B) and (C) of FIG. 1, the field correcting section 3 rearranges fields represented by the delay-resultant signal in response to the telecine phase signal. The field rearrangement is designed so that all abnormal frames will be changed into normal frames. Thus, all frames represented by a second NTSC video signal resulting from the field rearrangement are of the normal type. The field correcting section 3 outputs the field-rearrangement resultant signal (the second NTSC video signal) to the editing point correcting section 4.

The editing point correcting section 4 receives the vertical interpolation video signal and the field difference signal from the frame arrangement detecting section 1. The editing point correcting section 4 receives the field-rearrangement resultant signal (the second NTSC video signal) from the field correcting section 3. The editing point correcting section 4 processes the field-rearrangement resultant signal in response to the vertical interpolation video signal and the field difference signal. The signal processing by the editing point correcting section 4 interpolates a frame at a video editing point so that the frame has even and odd fields originating from a same frame of the motion picture. Specifically, an even field (or an odd field) is estimated from an immediately preceding odd field (or an immediately preceding even field) by an interpolation process, and the estimation resultant field replaces a corresponding actual field in the related frame. The editing point correcting section 4 outputs the interpolation-resultant signal to the filtering and combining section 5.

The filtering and combining section 5 subjects the output signal of the editing point correcting section 4 to a filtering process in a horizontal direction and also to a vertical filtering process between two fields. As shown in the portions (C) and (D) of FIG. 1, the filtering and combining section 5 combines an odd field and an even field In every frame represented by the output signal of the editing point correcting section 4. Thus, the filtering and combining section 5 converts the output signal of the editing point correcting section 4 into an intermediate video signal. It should be noted that the filtering and combining section 5 may include a noise reducer subjecting the output signal of the editing point correcting section 4 to a filtering process along a time base direction. The filtering and combining section 5 outputs the intermediate video signal to the data transmitting section 7.

As shown in the portion (D) of FIG. 1, there periodically occur two successive frames (for example, the frames "1ab" and "1cb") regarding the intermediate video signal which originate from a same frame (for example, the frame "1") of the motion picture. In other words, a set of two successive duplicate frames periodically occur with respect to the Intermediate video signal.

The disregarded frame deciding section 6 receives the telecine phase signal from the telecine phase generating section 2. The disregarded frame deciding section 6 generates a frame thinning signal in response to the telecine phase signal. The disregarded frame deciding section 6 outputs the frame thinning signal to the data transmitting section 7. The frame thinning signal enables the data transmitting section to thin out duplicate frames represented by the intermediate video signal.

The data transmitting section 7 receives the intermediate video signal from the filtering and combining section 5. The data transmitting section 7 receives the frame thinning signal from the disregarded frame deciding section 6. The data transmitting section 7 converts the intermediate video signal into a conversion-result video signal in response to the frame thinning signal. Specifically, as shown in the portions (D) and (E) of FIG. 1, the data transmitting section 7 disregards a former one (for example, the field "1ab") of two successive duplicate frames related to the first intermediate video signal and uses the latter one (for example, the field "1cb") of the two successive duplicate frames in the conversion-result video signal. In this way, the data transmitting section 7 thins out duplicate frames represented by the intermediate video signal. The conversion-result video signal has a picture rate corresponding to a frame frequency of 23.976 Hz. The data transmitting section 7 outputs the conversion-result video signal. The conversion-result video signal can be recorded on a video CD.

The conversion-result video signal is indirectly or directly transmitted to a video CD player. As shown in the portions (E) and (F) of FIG. 1, the video CD player changes the conversion-result video signal into a video CD signal by 2–3 conversion. According to the 2–3 conversion, one frame represented by the conversion-result video signal is changed into two successive fields related to the video CD signal, and a next frame represented by the conversion-result video signal is converted into next three successive fields related to the video CD signal. For example, the frame "2ba" represented by the conversion-result video signal is changed into two successive fields "2baa" and "2bab" related to the video CD signal while the frame "3bc" represented by the conversion-result video signal is converted into next three successive fields "3bca", "3bcb", and "3bcc" related to the video CD signal. The video CD player reproduces images represented by the video CD signal.

Frame Arrangement Detecting Section 1

Figure 3:
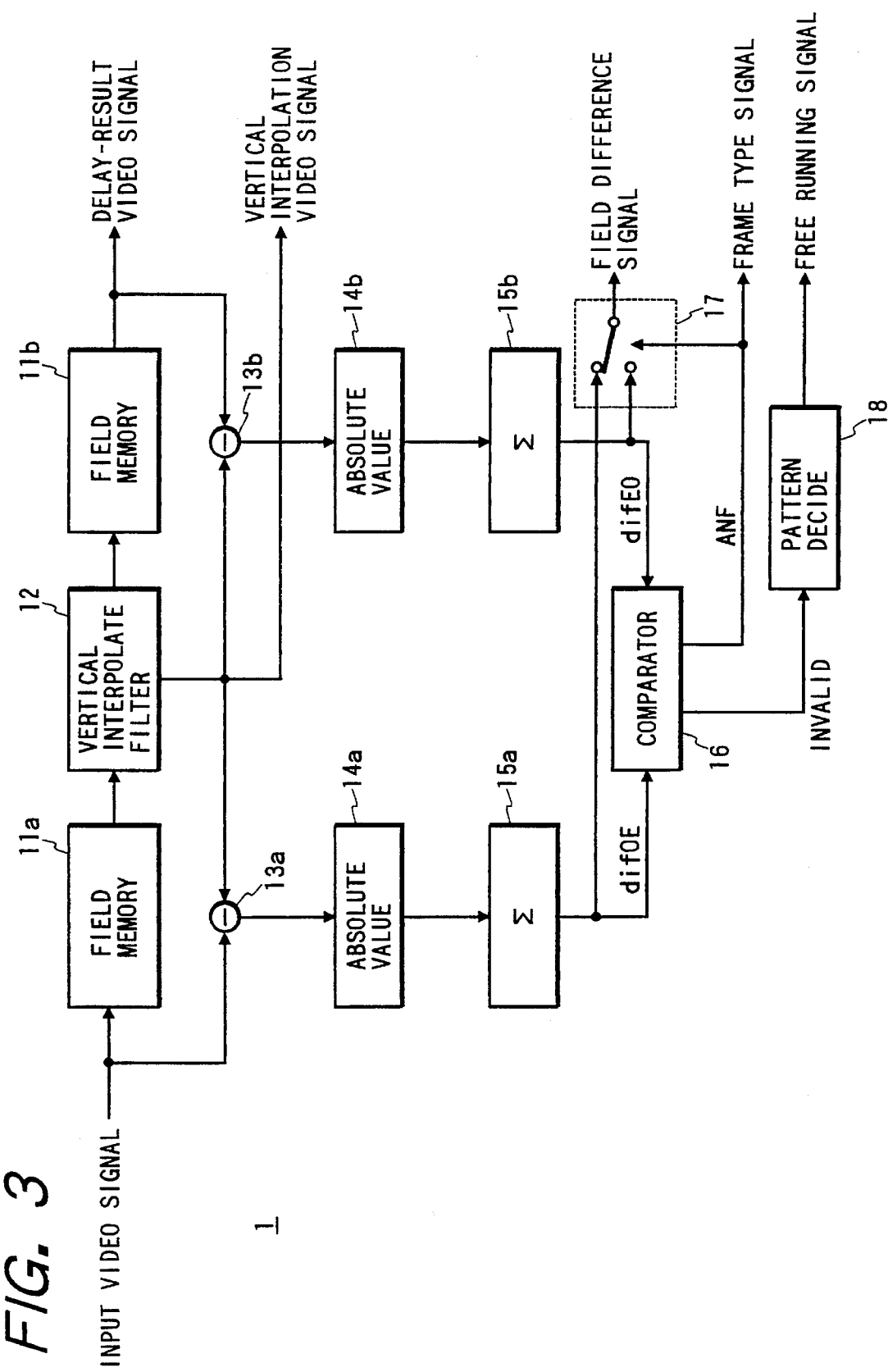
FIG. 3 is a block diagram of a first example of a frame arrangement detecting section in the apparatus of FIG. 2.

The frame arrangement detecting section 1 will now be described in detail. As shown in FIG. 3, the frame arrangement detecting section 1 includes field memories 11a and 11b, a vertical interpolation filter 12, subtracters 13a and 13b, absolute value calculators 14a and 14b, integrators 15a and 15b, a comparator 16, a switch 17, and a pattern deciding device 18.

The input video signal is applied to the field memory 11a. The field memory 11a, a line memory or line memories in the vertical interpolation filter 12, and the field memory 11b are connected in series. The input video signal is transmitted through the field memory 11a, the line memory or line memories in the vertical interpolation filter 12, and the field memory 11b while being delayed thereby. The delay-resultant video signal is outputted from the field memory 11b to the field correcting section 3 (see FIG. 2) and the subtracter 13b. Each of the field memories 11a and 11b provides a signal delay corresponding to a 1-field interval. Here, the signal outputted from the field memory 11b is delayed from the signal inputted to the field memory 11a by a time exactly equal to a 1-frame interval.

The vertical interpolation filter 12 processes the output video signal from the field memory 11a into the vertical interpolation video signal. The vertical interpolation filter 12 feeds the vertical interpolation video signal to the subtracters 13a and 13b and the editing point correcting section 4 (see FIG. 2). In the signal processing by the vertical interpolation filter 12, signal pieces of new pixels corresponding in position to pixels of an even field (or an odd field) are generated or estimated from signal pieces of actual pixels in an odd field (or an even field) which neighbor the new pixels. The new pixels are represented by the vertical interpolation video signal while the actual pixels are represented by the output video signal from the field memory 11a.

The input video signal is applied to the subtracter 13a. The vertical interpolation video signal is fed from the vertical interpolation filter 12 to the subtracter 13a. As a result of the function of the field memory 11a, a field related to the vertical interpolation video signal immediately precedes a field represented by the input video signal. The subtracter 13a executes subtraction between the input video signal and the vertical interpolation video signal, and outputs a signal representing the difference between the input video signal and the vertical interpolation video signal. The output signal of the subtracter 13a represents the difference between the signal pieces corresponding to equal-position pixels in the current field and the first immediately preceding field. The output signal of the subtracter 13a is fed to the absolute value calculator 14a, and is processed thereby. The absolute value calculator 14a outputs a signal representing the absolute value of the difference indicated by the output signal of the subtracter 13a. The output signal of the absolute value calculator 14a is fed to the integrator 15a, and is integrated thereby over a 1-field interval. Thus, the output signal of the absolute value calculator 14a is made into an integration-resultant signal "difOE" which corresponds to the difference between the current field and the first immediately preceding field. The value represented by the inter-field difference signal "difOE" increases as the degree of a correlation between the current field and the first immediately preceding field decreases.

The delay-resultant video signal is fed from the field memory 11b to the subtracter 13b. The vertical interpolation video signal is fed from the vertical interpolation filter 12 to the subtracter 13b. As a result of the function of the field memories 11a and 11b, a field related to the delay-resultant video signal precedes a field represented by the input video signal by a 2-field interval. The subtracter 13b executes subtraction between the vertical interpolation video signal and the delay-resultant video signal, and outputs a signal representing the difference between the vertical interpolation video signal and the delay-resultant video signal. The output signal of the subtracter 13b represents the difference between the signal pieces corresponding to equal-position pixels in the first immediately preceding field and the second immediately preceding field. The output signal of the subtracter 13b is fed to the absolute value calculator 14b, and is processed thereby. The absolute value calculator 14b outputs a signal representing the absolute value of the difference indicated by the output signal of the subtracter 13a. The output signal of the absolute value calculator 14b is fed to the integrator 15b, and is integrated thereby over a 1-field interval. Thus, the output signal of the absolute value calculator 14b is made into an integration-resultant signal "difEO" which corresponds to the difference between the first immediately preceding field and the second immediately preceding field. The value represented by the inter-field difference signal "difEO" increases as the degree of a correlation between the first immediately preceding field and the second immediately preceding field decreases.

For a higher reliability, it is preferable that the ranges of the integration by the integrators 15a and 15b are exclusive of a caption region added during a video editing process.

The comparator 16 receives the inter-field difference signal "difOE" from the integrator 15a. The comparator 16 receives the inter-field difference signal "difEO" from the integrator 15b. The operation of the comparator 16 is synchronized with every frame so that the comparator 16 becomes active when the output signal "difOE" of the integrator 15a represents the difference between odd and even field in a common frame. The device 16 compares the inter-field difference signal "difOE" and the inter-field difference signal "difEO". When the value represented by the inter-field difference signal "difOE" is greater than the value represented by the inter-field difference signal "difEO", the comparator 16 outputs a high-level frame type signal "ANF". Otherwise, the comparator 16 outputs a low-level frame type signal "ANF". The frame type signal "ANF" assumes a high-level state and a low-level state for a normal frame and an abnormal frame respectively. The comparator 16 feeds the frame type signal "ANF" to the switch 17 and the telecine phase generating section 2 (see FIG. 2).

The switch 17 receives the inter-field difference signal "difOE" from the integrator 15a. The switch 17 receives the inter-field difference signal "difEO" from the integrator 15b. The switch 17 receives the frame type signal "ANF" from the comparator 16. The operation of the switch 17 is synchronized with every frame so that the switch 17 becomes active when the output signal "difOE" of the integrator 15a represents the difference between odd and even field in a common frame. The switch 17 selects one of the interfield difference signal "difOE" and the inter-field difference signal "difEO" in response to the frame type signal "ANF", and transmits the selected signal to the editing point correcting section 4 (see FIG. 2) as the field difference signal.

The comparator 16 is provided with a device for determining whether or not the values represented by the inter-field difference signals "difOE" and "difEO" are smaller than a predetermined reference value. When the values represented by the inter-field difference signals "difOE" and "difEO" are smaller than the predetermined reference value, the comparator 16 outputs an invalid signal. Otherwise, the comparator 16 does not output the invalid signal.

The pattern deciding device 18 receives the invalid signal from the comparator 16. The pattern deciding device 18 derives a pattern of the occurrences of the invalid signals. By a pattern matching process, the pattern deciding device 18 compares the derived pattern with a predetermined reference pattern corresponding to a pattern of the occurrences of invalid signals for a typical 2–3 conversion resultant signal rich in moving picture regions. When the derived pattern is resemblant to the predetermined reference pattern by more than a given degree, the pattern deciding device 18 outputs an inactive free running signal. Otherwise, the pattern deciding device 18 outputs an active free running signal. The free running signal is fed from the pattern deciding device 18 to the telecine phase generating section 2 (see FIG. 2). The pattern matching process by the pattern deciding device 18 is designed to avoid the occurrence of a wrong decision when the input video signal is provided with time segments representing images having a small inter-field correlation.

Figure 4:
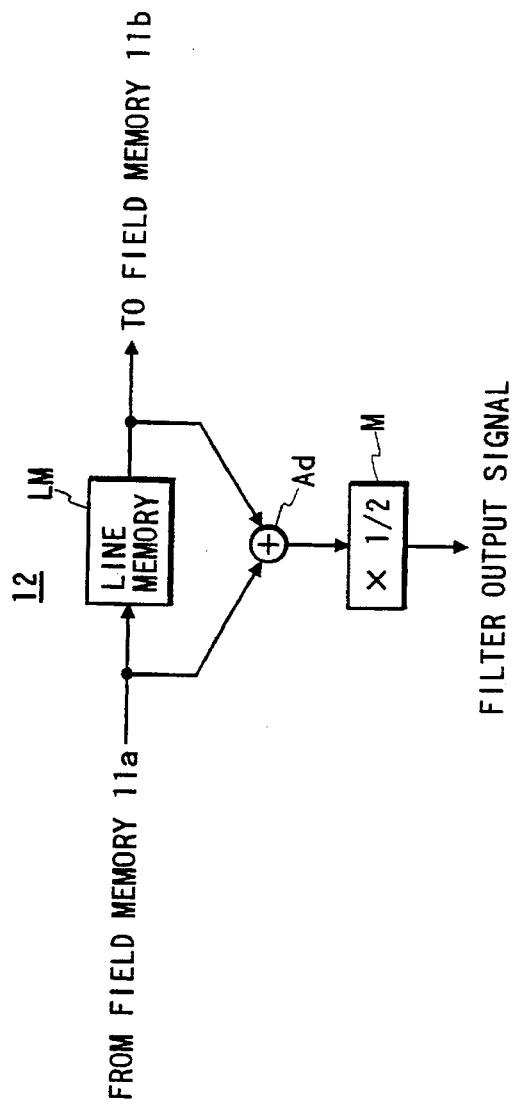
FIG. 4 is a block diagram of a first example of a vertical interpolation filter in the frame arrangement detecting section of FIG. 3.

FIG. 4 shows a first example of the vertical interpolation filter 12. With reference to FIG. 4, the vertical interpolation filter 12 includes a line memory "LM", an adder "Ad", and a multiplier "M". The output signal of the field memory 11a (see FIG. 3) is written into the line memory "LM", and is then read out from the line memory "LM" before being fed to the field memory 11b (see FIG. 3). The line memory "LM" provides a signal delay corresponding to a 1-line interval. The output signal from the field memory 11a and the output signal from the line memory "LM" are combined by the adder "Ad". The multiplier "M" multiplies the output signal of the adder "Ad" by a factor of ½, and thereby changes the output signal of the adder "Ad" into the vertical interpolation signal. The multiplier "M" outputs the vertical interpolation video signal as a filter output signal.

Figure 5:
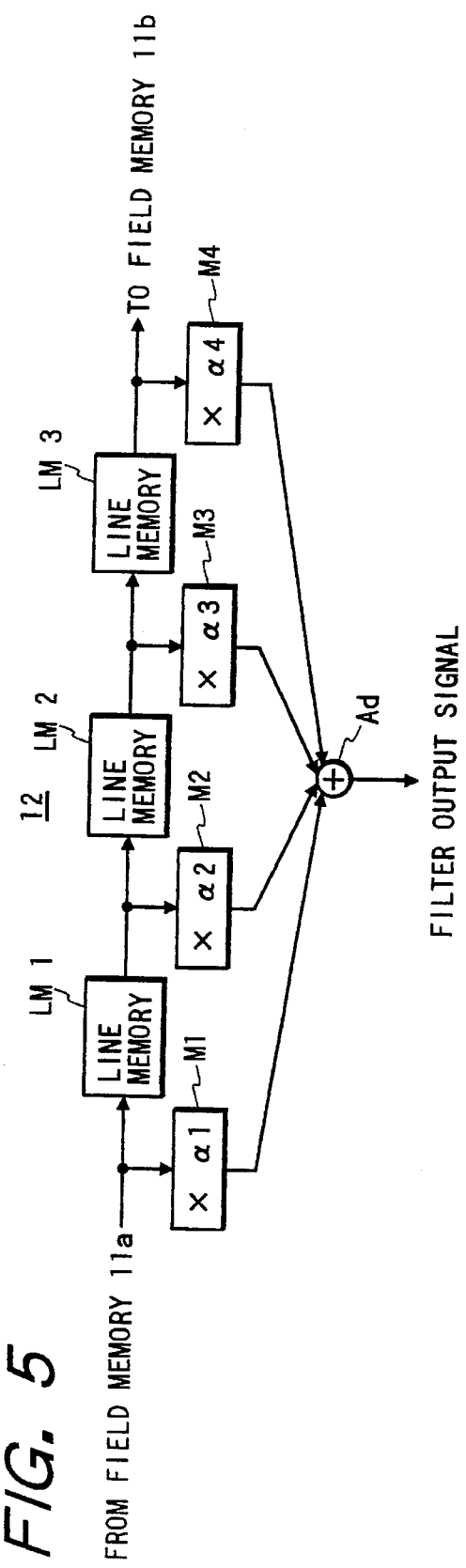
FIG. 5 is a block diagram of a second example of the vertical interpolation filter in the frame arrangement detecting section of FIG. 3.

FIG. 5 shows a second example of the vertical interpolation filter 12. With reference to FIG. 5, the vertical interpolation filter 12 includes line memory "LM1", "LM2", and "LM3", an adder "Ad", and multipliers "M1", "M2", "M3", and "M4". The output signal of the field memory 11a (see FIG. 3) is fed to the line memory "LM1". The line memories "LM1", "LM2", and "LM3" are connected in series. The output signal of the field memory 11a is transmitted through the line memories "LM1", "LM2", and "LM3" while being delayed thereby. Each of the line memories "LM1", "LM2", and "LM3" provides a signal delay corresponding to a 1-line interval. The output signal of the line memory "LM3" is fed to the field memory 11b (see FIG. 3). The multiplier "M1" multiplies the output signal of the field memory 11a by a predetermined coefficient "α1". The multiplier "M2" multiplies the output signal of the line memory "LM1" by a predetermined coefficient "α2". The multiplier "M3" multiplies the output signal of the line memory "LM2" by a predetermined coefficient "α3". The multiplier "M4" multiplies the output signal of the line memory "LM3" by a predetermined coefficient "α4". The adder "Ad" combines the output signals of the multipliers "M1", "M2", "M3", and "M4" into the vertical interpolation signal. The adder "Ad" outputs the vertical interpolation video signal as a filter output signal.

Figure 6:
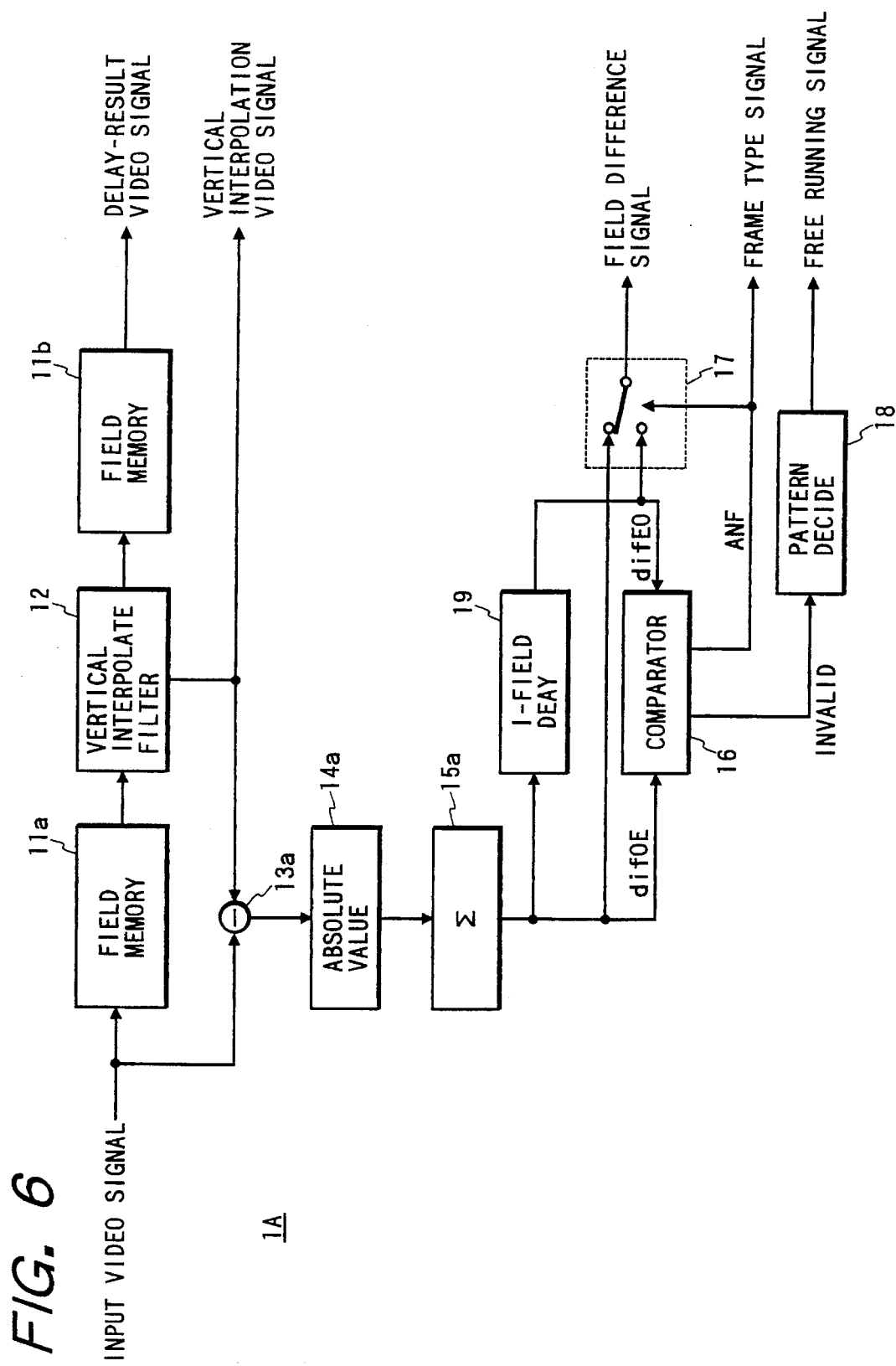
FIG. 6 is a block diagram of a second example of the frame arrangement detecting section in the apparatus of FIG. 2.

FIG. 6 shows a modified frame arrangement detecting section 1A which may replace the frame arrangement detecting section 1 of FIG. 3. The frame arrangement detecting section 1A of FIG. 6 is similar to the frame arrangement detecting section 1 of FIG. 3 except for the following design change.

The frame arrangement detecting section 1A of FIG. 6 includes a delay device 19 which replaces the combination of the subtracter 13b, the absolute value calculator 14b, and the integrator 15b. The delay device 19 delays the output signal "difOE" of the integrator 15a by a 1-field interval, and thereby changes the output signal "difOE" of the integrator 15a into an inter-field difference signal "difEO". The delay device 19 outputs the inter-field difference signal "difEO" to the comparator 16 and the switch 17.

Telecine Phase Generating Section 2

With reference to FIG. 7, the telecine phase generating section 2 includes a phase detector 21 and a phase signal generator 22. The phase detector 21 receives the free running signal and the frame type signal from the frame arrangement detecting section 1 (see FIG. 2). The frame type signal has a waveform such as shown in the portion (B) of FIG. 8. The free running signal has a waveform such as shown in the portion (C) of FIG. 8.

Figures 8A, 8B, 8C, 8D, 8E:
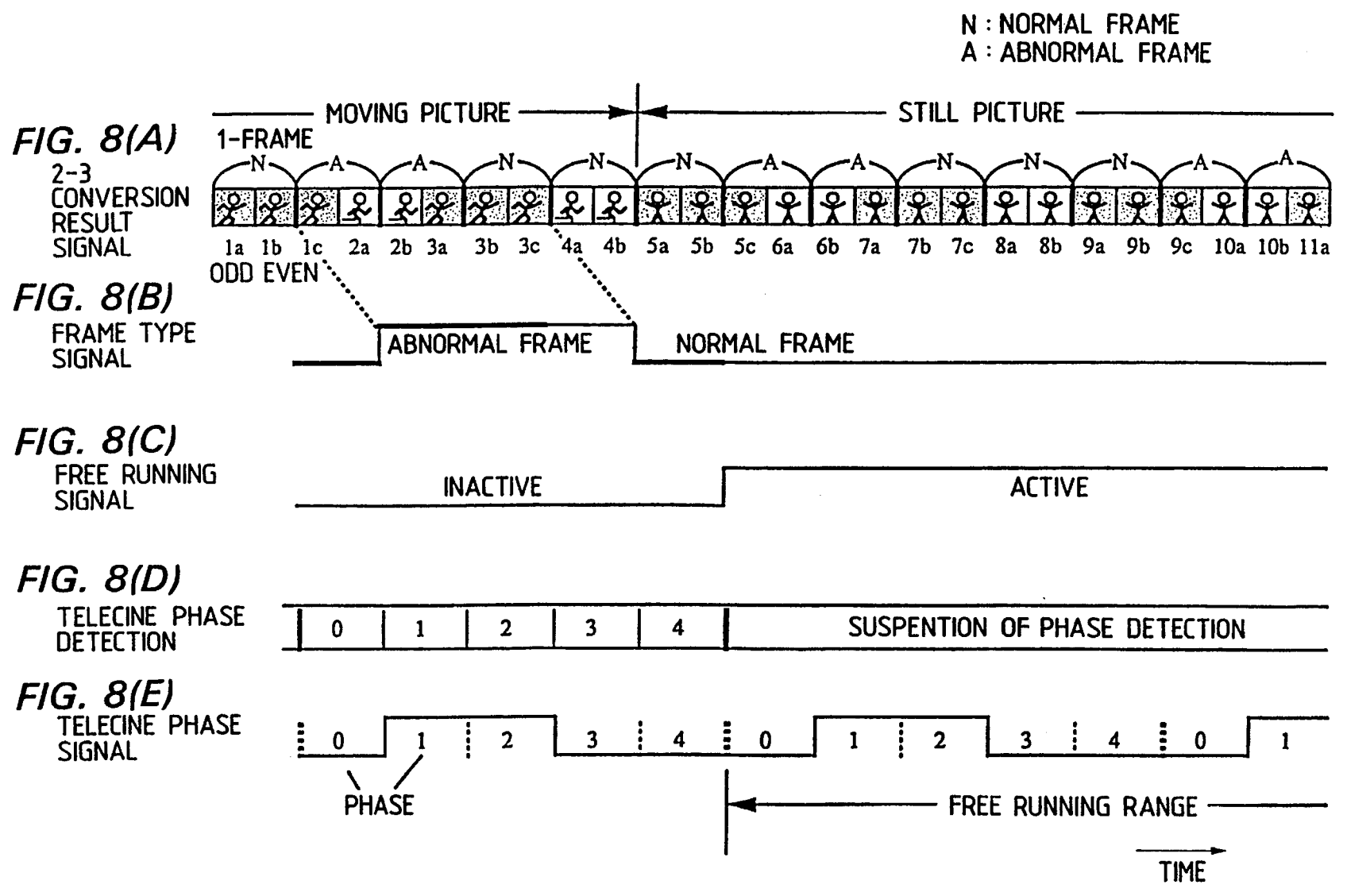

While the free running signal remains inactive, the phase detector 21 sequentially detects frames, related to the 2–3 conversion resultant signal (the input video signal, see the portion (A) of FIG. 8), as phases "0", "1", "2", "3", and "4" in response to a frame pulse signal or the frame-synchronized components of the frame type signal. Furthermore, the phase detector 21 discriminates phases corresponding to abnormal frames from phases corresponding to normal frames In response to the frame type signal. Here, "phase" means a temporal position of a frame in one cycle. The phase detector 21 outputs the phase-detection resultant signal to the phase signal generator 22. With reference to FIG. 8, the phases (the frames) "1" and "2" in the portion (D) of the drawing are detected or designated as corresponding to abnormal frames.

The phase signal generator 22 produces the telecine phase signal in response to the output signal of the phase detector 21. As shown in the portion (E) of FIG. 8, the telecine phase signal assumes a high-level state for every abnormal frame and a low-level state for every normal frame.

While the free running signal remains inactive, the phase detector 21 continues to detect phases. When the free running signal changes to the active state, the phase detector 21 suspends the phase detection as shown in the portion (D) of FIG. 8. In this case, as shown in the portion (E) of FIG. 8, the phase signal generator 22 falls into a self running state or a free running state where the phase signal generator 22 periodically repeats and outputs the last cycle of the telecine phase signal without providing any discontinuity from the last phase detected by the phase detector 21. To this end, the phase signal generator 22 includes a memory storing information of one cycle of the telecine phase signal.

Field Correcting Section 3

With reference to FIG. 9, the field correcting section 3 includes a frame memory 31, an AND circuit 32, and a switch 33. The output signal of the frame arrangement detecting section 1 (see FIG. 2) is written into the frame memory 31, and is then read out from the frame memory 31 before being fed to the switch 33. The frame memory 31 provides a signal delay correspond to a 1-frame interval.

The AND circuit 32 receives the telecine phase signal from the telecine phase generating section 2 (see FIG. 2). The telecine phase signal has a waveform such as shown in the portion (B) of FIG. 10. The AND circuit 32 receives a frame pulse signal from a master sync circuit (not shown). The frame pulse signal has a waveform such as shown in the portion (D) of FIG. 10. Specifically, the frame pulse signal changes between a logic state of "0" and a logic state of "1" each time a field is replaced by a next field. The AND circuit 32 executes AND operation between the telecine phase signal and the frame pulse signal, thereby generating a field selection signal having a waveform such as shown in the portion (E) of FIG. 10.

The switch 33 receives the output signal of the frame arrangement detecting section 1. The switch 33 receives the output signal of the frame memory 31. The switch 33 receives the field selection signal from the AND circuit 32. The switch 33 selects one of the output signal of the frame arrangement detecting section 1 and the output signal of the frame memory 31 in response to the field selection signal, and outputs the selected signal as the field-rearrangement resultant signal. Specifically, the switch 33 selects the output signal of the frame arrangement detecting section 1 when the field selection signal is in a logic state of "0". The switch 33 selects the output signal of the frame memory 31 when the field selection signal is in a logic state of "1". The change of the signal selection by the switch 33 results in the rearrangement of the fields represented by the output signal of the frame arrangement detecting section 1.

The output signal of the frame arrangement detecting section 1 is delayed from the 2–3 conversion resultant signal (the input video signal) having a state which changes every field as shown in the portion (A) of FIG. 10. During the signal processing by the field correcting section 3, fields represented by the output signal of the frame arrangement detecting section 1 are rearranged so that every pair of successive odd and even fields regarding the field-arrangement resultant signal originate from a same frame of the motion picture. In the portion (A) of FIG. 10, there are four normal frames "N" and three abnormal frames "A". The first abnormal frame is composed of an odd field "1c" and an even field "2a". The second abnormal frame is composed of an odd field "2b" and an even field "3a". The third abnormal frame is composed of an odd field "5c" and an even field "6a". As shown in the portion (E) of FIG. 10, the field selection signal changes to and remains at a logic state of "1" in a temporal position of the latter field (the even field) of each abnormal frame. With regard to each abnormal frame, during a first field interval, the switch 33 selects the output signal of the frame arrangement detecting section i so that the field represented by the field-rearrangement resultant signal agrees with the field related to the output signal of the frame arrangement detecting section 1. On the other hand, during a second field interval, the switch 33 selects the output signal of the frame memory 31 so that the field represented by the field-rearrangement resultant signal agrees with the field regarding the output signal of the frame memory 31 which precedes the field regarding the output signal of the field arrangement detecting section 1 by a 1-frame interval. Accordingly, the latter field or the even field ("2a", "3a", and "6a" in FIG. 10) in each abnormal frame is replaced by the latter field ("1b", "2a", and "5b" in FIG. 10) of the immediately preceding frame. Thus, as shown in the portions (A) and (F) of FIG. 10, each abnormal frame is changed into a normal frame.

Disregarded Frame Deciding Section 6

As previously described, an NTSC video signal resulting from 2–3 conversion of a motion picture has a telecine period corresponding to an interval of five frames. The telecine period of the NTSC video signal goes out of order at some moments. In the case where a motion picture has a rate of 24 frames per second while an apparatus handling an NTSC video signal has a frame frequency of 29.97 Hz, a telecine phase is shifted once per about 17 seconds. To compensate for such a shift of the telecine phase, the disregarded frame deciding section 6 generates the frame thinning signal which is designed to change the frame frequency to 23.976 Hz in temporal average for a long time.

Figure 11:
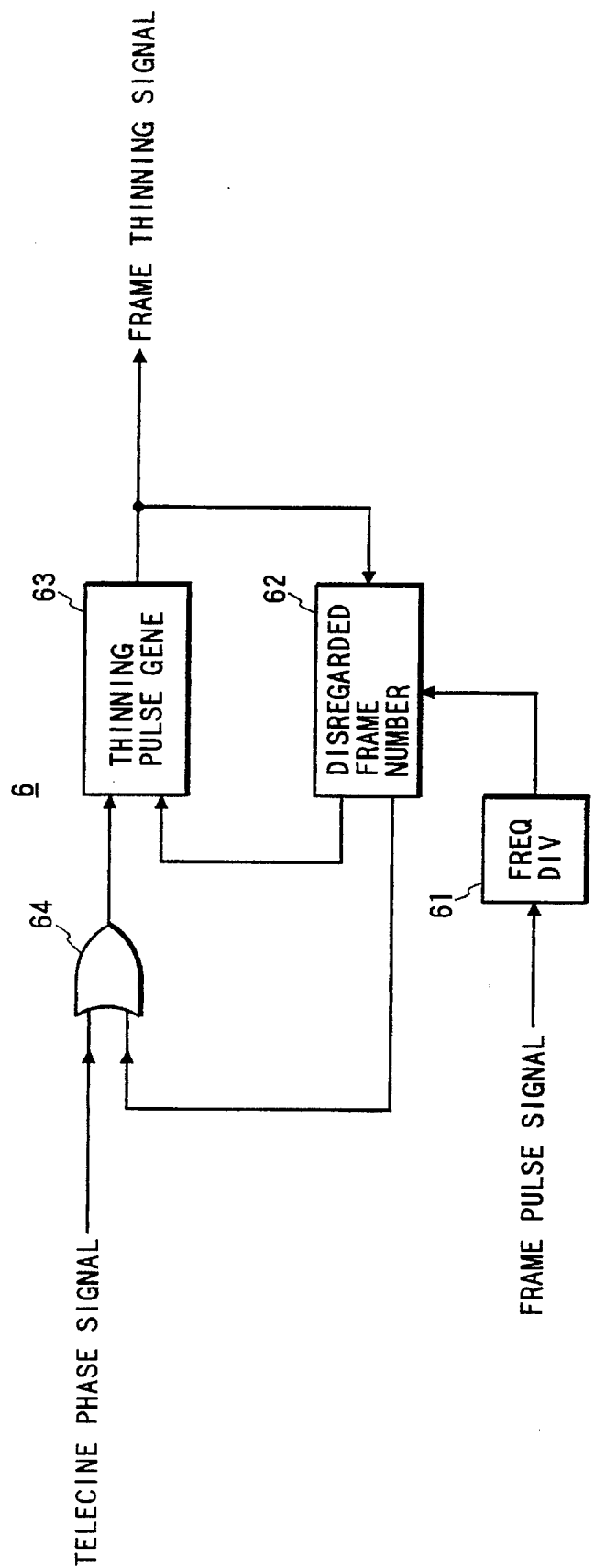
FIG. 11 is a block diagram of a thinning frame deciding section in the apparatus of FIG. 2.

With reference to FIG. 11, the disregarded frame deciding section 6 includes a frequency divider 61, a thinning number setting device 62, a thinning pulse generator 63, and an OR circuit 64.

Figure 12:
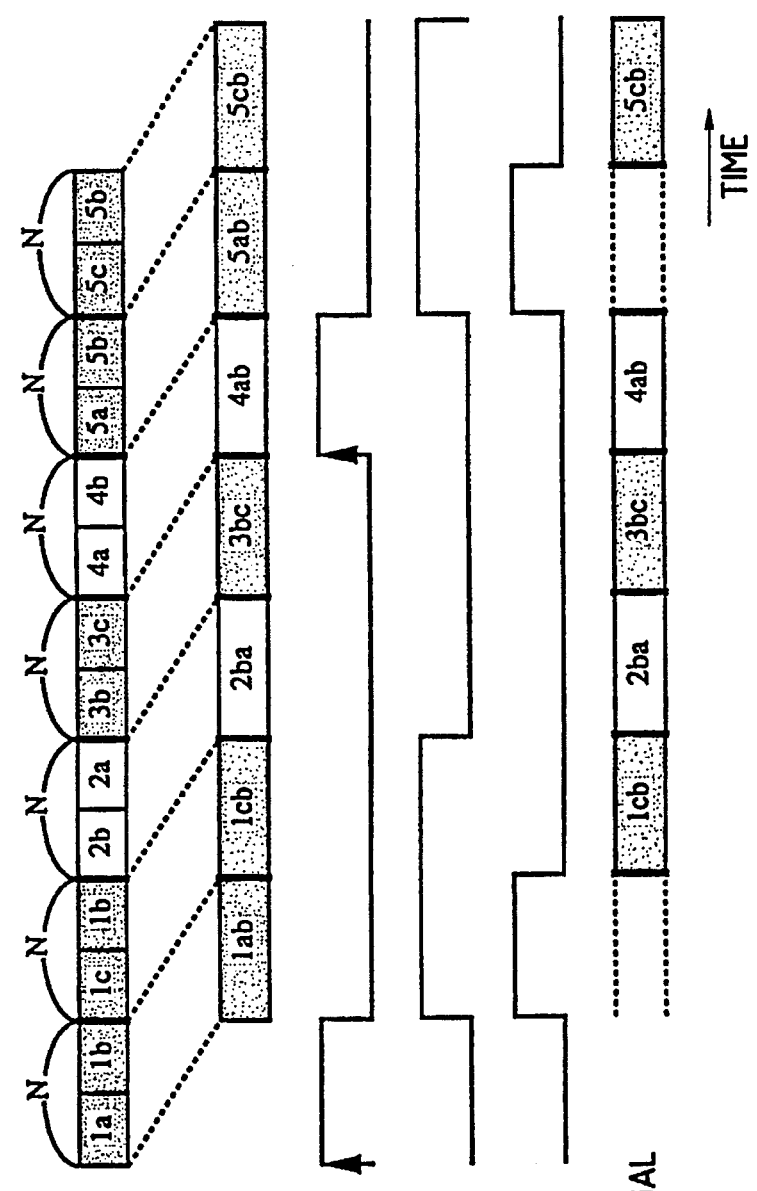
FIG. 12 is a time-domain diagram of signals in connection with the thinning frame deciding section of FIG. 11.

The frequency divider 61 receives a frame pulse signal from a master sync circuit (not shown). The device 61 divides the frequency of the frame pulse signal by five, and thereby generates and outputs a start pulse signal having a waveform such as shown in the portion (C) of FIG. 12. The thinning number setting device 62 receives the start pulse signal from the frequency divider 61. The thinning number setting device 62 sets a disregarded frame number (normally equal to 1) in response to every pulse of the start pulse signal. The disregarded frame number means the number of frames to be disregarded among five frames following the leading edge of every pulse of the start pulse signal. The thinning number setting device 62 feeds the thinning pulse generator 63 with a signal representative of the disregarded frame number so that the disregarded frame number is also set in the thinning pulse generator 63.

The thinning pulse generator 63 receives the telecine phase signal from the telecine phase generating section 2 (see FIG. 2) via the OR circuit 64. The telecine phase signal has a waveform such as shown in the portion (D) of FIG. 12. The thinning pulse generator 63 includes a counter which counts up the leading edge of every pulse in the telecine phase signal. The thinning pulse generator 63 includes a pulse-width limiting circuit which acts on the output signal of the counter. As will be made clear later, the thinning pulse generator 63 produces a pulse for deleting a desired number of frames. Specifically, the pulse-width limiting circuit in the thinning pulse generator 63 changes the width of a pulse in the output signal of the counter to a 1-frame width. The pulse-width limiting circuit outputs the frame thinning signal which is synchronized with the telecine phase signal as shown in the portions (D) and (E) of FIG. 12. The frame thinning signal has a pulse with a width corresponding to a 1-frame interval. When the counted pulse number reaches the disregarded frame number, the counter interrupts the counting process. Thus, in this case, the counter is insensitive to a later pulse in the telecine phase signal. The frame thinning signal is fed from the thinning pulse generator 63 to the data transmitting section 7 (see FIG. 2).

The thinning number setting device 62 includes an up/down counter pre-loaded with a signal representative of a predetermined number equal to the disregarded frame number minus one. The predetermined number is equal to, for example, zero. The up/down counter in the thinning number setting device 62 counts up the leading edge of every pulse in the start pulse signal (see the portion (C) of FIG. 12) outputted from the frequency divider 61. Accordingly, the number represented by the output signal of the up/down counter reaches the disregarded frame number each time every pulse in the start pulse signal occurs. As previously described, the thinning number setting device 62 feeds the thinning pulse generator 63 with the signal representative of the disregarded frame number so that the disregarded frame number is also set in the thinning pulse generator 63. The up/down counter in the thinning number setting device 62 counts down a pulse in the frame thinning signal (see the portion (E) of FIG. 12) outputted from the thinning pulse generator 63. Accordingly, the number represented by the up/down counter is decremented from the disregarded frame number by one in response to a pulse in the frame thinning signal.

In the case where the telecine phase signal remains in the low-level state during a 5-frame interval or more, a pulse continues to be absent from the frame thinning signal outputted by the thinning pulse generator 63. In this case, the number represented by the up/down counter in the thinning number setting circuit 62 is incremented from the disregarded frame number when a next pulse occurs in the start pulse signal outputted from the frequency divider 61. The increment-resultant signal is fed from the thinning number setting circuit 62 to the thinning pulse generator 63 via the OR circuit 64 as a compulsory thinning pulse. The thinning pulse generator 63 outputs a pulse of the frame thinning signal in response to the compulsory thinning pulse.

Editing Point Correcting Section 4

Figure 13:
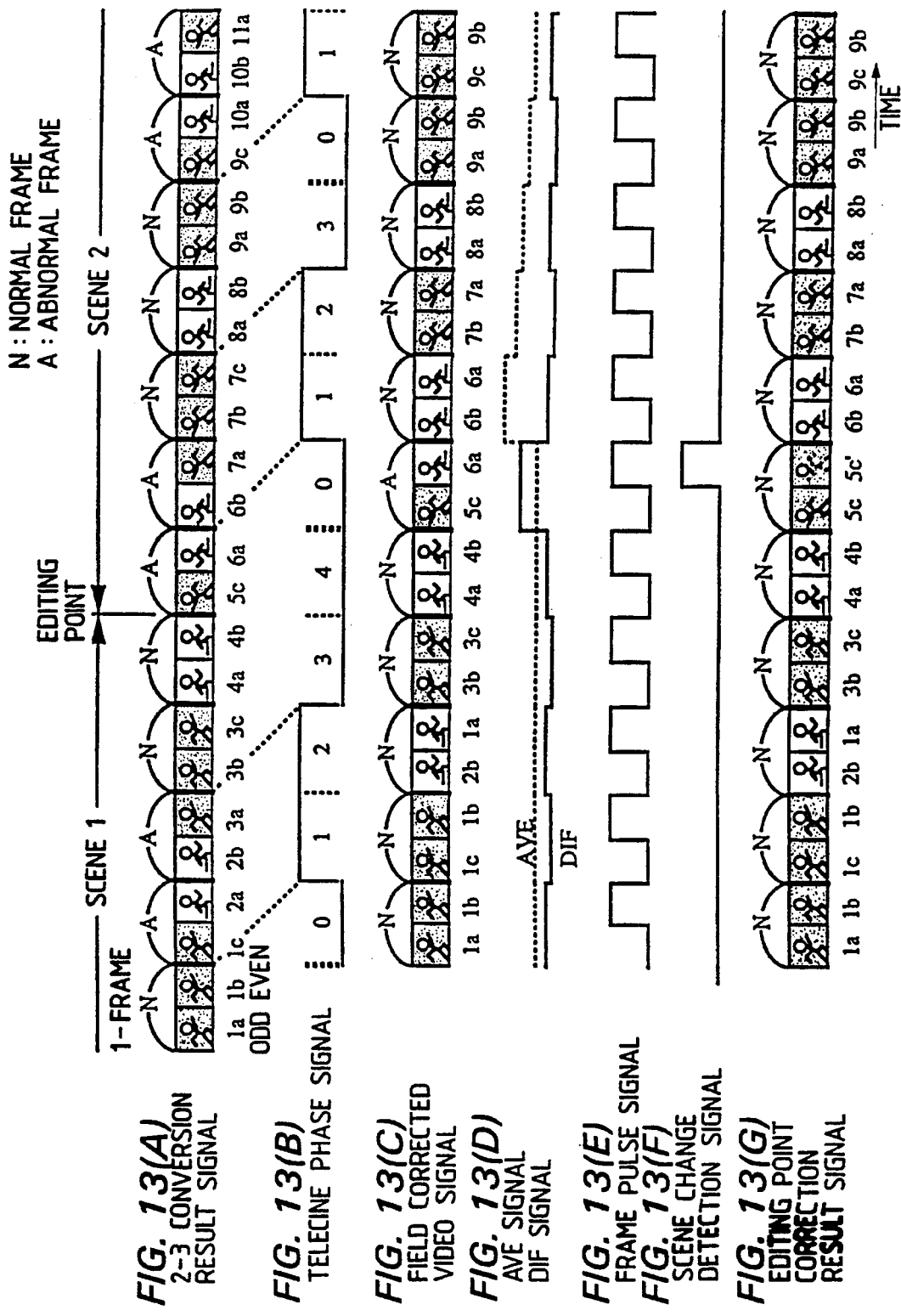
FIG. 13 is a time-domain diagram of signals in connection with an editing point correcting section in the apparatus of FIG. 2.

As shown in the portion (A) of FIG. 13, in some cases, an NTSC video signal resulting from 2–3 conversion of a motion picture has a point at which an editing process is executed. If two fields which originate from different frames of a motion picture respectively are combined through vertical filtering upon an editing point, resultant image information tends to be poor in quality. The editing point correcting section 4 serves to remove such a problem.

Figure 14:
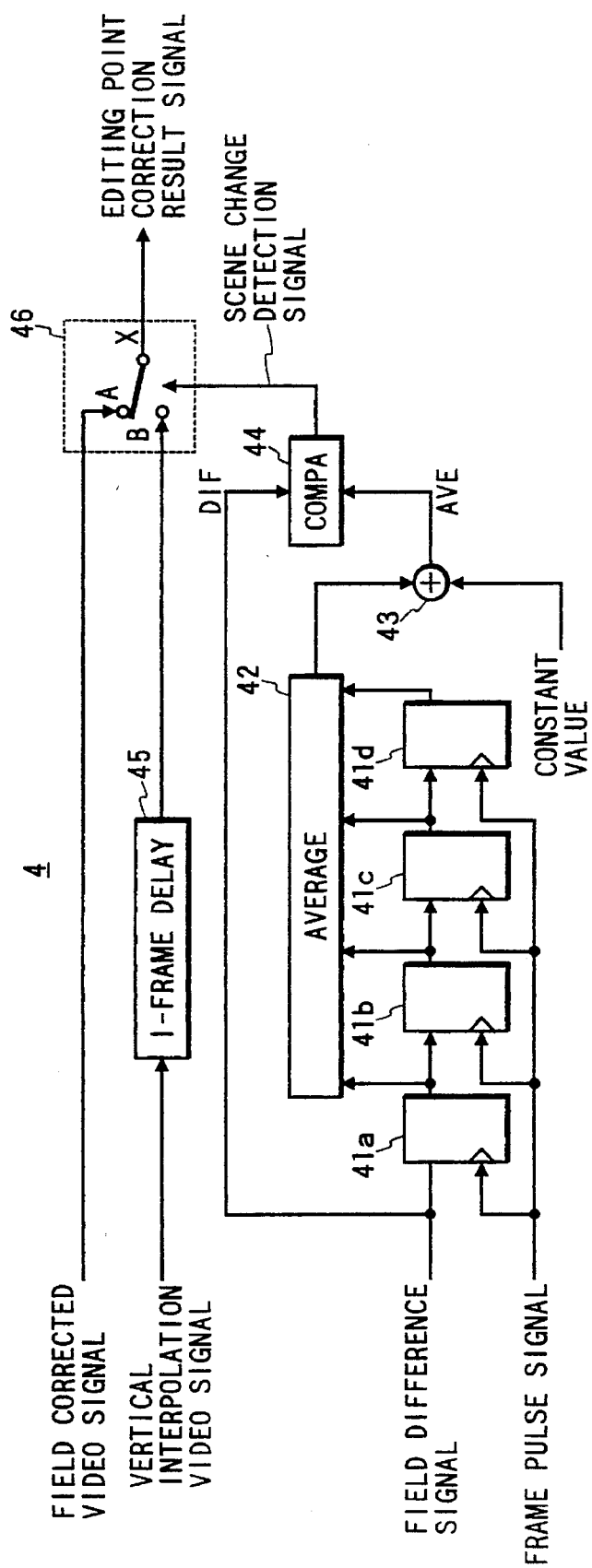
FIG. 14 is a block diagram of the editing point correcting section in the apparatus of FIG. 2.

With reference to FIG. 14, the editing point correcting section 4 includes delay devices 41a, 41b, 41c, and 41d, an averaging circuit 42, an adder 43, a comparator 44, a delay device 45, and a switch 46.

The field difference signal outputted from the frame arrangement detecting section 1 is fed to the delay device 41a. The delay devices 41a, 41b, 41c, and 41d are connected in series. Each of the delay devices 41a, 41b, 41c, and 41d includes a latch fed with a frame pulse signal from a master sync circuit (not shown). The frame pulse signal is used as an operation timing pulse signal for the latching process. The frame pulse signal has a waveform such as shown in the portion (E) of FIG. 13. The field difference signal is transmitted through the delay devices 41a, 41b, 41c, and 41d while being delayed thereby. Each of the delay devices 41a, 41b, 41c, and 41d provides a signal delay corresponding to a 1-frame interval. The averaging circuit 42 determines a mean (an average) of the output signals from the delay devices 41a, 41b, 41c, and 41d. Thus, the field difference signal is temporally averaged for an interval of four frames.

The adder 43 receives the output signal of the averaging circuit 42 which represents the determined mean. The adder 43 also receives a signal indicating a predetermined constant value. The constant-value signal is generated by a suitable device (not shown). The adder 43 adds the output signal of the averaging circuit and the constant-value signal, thereby outputting a signal "AVE" representing the addition of the mean and the constant value. The comparator 44 compares the field difference signal and the output signal of the adder 43. The field difference signal "DIF" has a state which varies as shown by the solid lines in the portion (D) of FIG. 13. On the other hand, the output signal "AVE" of the adder 43 has a state which varies as shown by the broken lines in the portion (D) of FIG. 13. When the value represented by the field difference signal "DIF" exceeds the value represented by the output signal "AVE" of the adder 43, the comparator 44 outputs an active scene change detection signal as shown in the portion (F) of FIG. 13. Otherwise, the comparator 44 outputs an inactive scene change detection signal.

The vertical interpolation video signal outputted from the frame arrangement detecting section 1 (see FIG. 2) is transmitted through the delay device 45 to the switch 46. The delay device 45 provides a signal delay corresponding to a 1-frame interval. The switch 46 receives the field-rearrangement resultant signal from the field correction section 3 (see FIG. 2). The switch 46 receives the scene change detection signal from the comparator 44. The switch 46 selects one of the field-rearrangement resultant signal and the output signal from the delay device 45, and transmits the selected signal to the filtering and combining section 5 (see FIG. 2). Specifically, the switch 46 continues to select the field-rearrangement resultant signal while the scene change detection signal remains inactive. The switch 46 selects the output signal of the delay device 45 when the scene change detection signal becomes active. Therefore, as shown in the portions (A), (C), and (G) of FIG. 13, an abnormal frame of fields "5c" and "6a" which immediately follows the editing point is changed into a normal frame of fields "5c" and "5c'". It should be noted that the field "5c'" is generated from the field "5c" through the vertical interpolation process by the frame rearrangement detecting section 1.

Filtering and Combining Section 5

Figure 15:
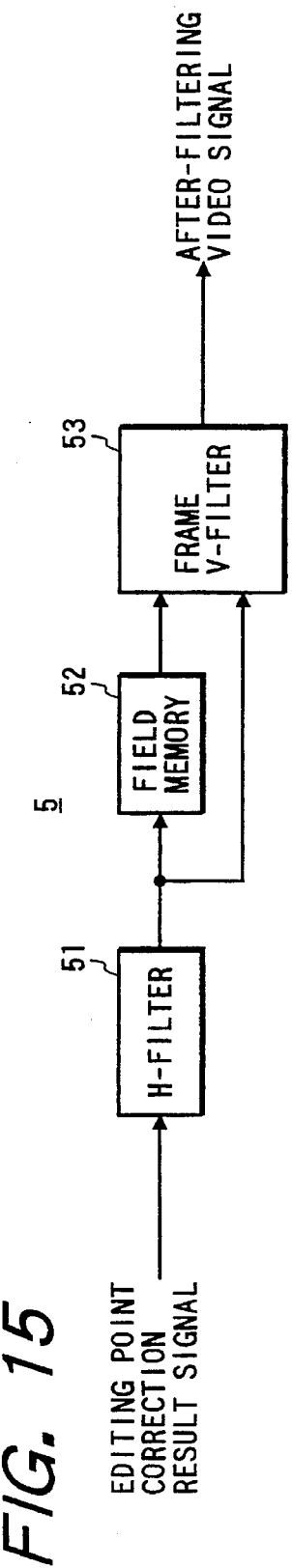
FIG. 15 is a block diagram of a filtering and combining section in the apparatus of FIG. 2.

With reference to FIG. 15, the filtering and combining section 5 includes a horizontal filter 51, a field memory 52, and a frame vertical filter 53.

The output signal of the editing point correcting section 4 is subjected by the filter 51 to a filtering process along a horizontal direction. The filtering by the filter 51 is designed to halve the horizontal band width.

The output signal of the horizontal filter 51 is transmitted to the frame vertical filter 53 via the field memory 52. The field memory 52 provides a signal delay corresponding to a 1-field interval. Also, the output signal of the horizontal filter 51 is directly applied to the frame vertical filter 53. Thus, the odd-field signal and the even-field signal related to a common frame are simultaneously fed to the frame vertical filter 53.

The odd-field signal and the even-field signal are combined by the frame vertical filter 53. Specifically, the odd field and the even field represented by the two signals are combined into a frame related to the output signal of the frame vertical filter 53. In addition, the frame vertical filter 53 execute a vertical filtering process for halving the vertical band width. The output signal of the frame vertical filter 53 is fed to the data transmitting section 7 as the intermediate video signal.

It should be noted that the filtering and combining section 5 may include a noise reducer subjecting the output signal of the editing point correcting section 4 to a filtering process along a time base direction.

FIG. 16 shows a first example of the frame vertical filter 53. With reference to FIG. 16, the frame vertical filter 53 includes a line memory 53A, an adder 53B, a multiplier 53C, an adder 53D, and a multiplier 53E. The output signal of the field memory 52 (see FIG. 15) is written into the line memory 53A, and is then read out from the line memory 53A before being fed to the adder 53B. The line memory 53A provides a signal delay corresponding to a 1-line interval. The output signal from the field memory 52 and the output signal from the line memory 53A are combined by the adder 53B. The multiplier 53C multiplies the output signal of the adder 53B by a factor of ½. The output signal from the horizontal filter 51 (see FIG. 15) and the output signal from the multiplier 53C are combined by the adder 53D. The multiplier 53E multiplies the output signal of the adder 53D by a factor of ½, and thereby changes the output signal of the adder 53D into a filter output signal constituting the intermediate video signal.

FIG. 17 shows a second example of the frame vertical filter 53. With reference to FIG. 17, the frame vertical filter 53 includes line memories 53F, 53G, and 53H, multipliers 53I, 53J, 53K, 53L, and 53M, and an adder 53N. The output signal of the field memory 52 (see FIG. 15) is fed to the line memory 53F. The line memories 53F, 53G, and 53H are connected in series. The output signal of the field memory 52 is transmitted through the line memories 53F, 53G, and 53H while being delayed thereby. Each of the line memories 53F, 53G, and 53H provides a signal delay corresponding to a 1-line interval. The multiplier 53I multiplies the output signal of the field memory 52 by a predetermined coefficient "β1". The multiplier 53J multiplies the output signal of the line memory 53F by a predetermined coefficient "β2". The multiplier 53K multiplies the output signal of the line memory 53G by a predetermined coefficient "β3". The multiplier 53L multiplies the output signal of the line memory 53H by a predetermined coefficient "β4". The multiplier 53M multiplies the output signal of the horizontal filter 51 (see FIG. 15) by a predetermined coefficient "γ1". The adder 53N combines the output signals of the multipliers 53I, 53J, 53K, 53L, and 53M into a filter output signal constituting the intermediate video signal.

Data Transmitting Section 7

With reference back to FIG. 2, the data transmitting section 7 receives the intermediate video signal from the filtering and combining section 5. The data transmitting section 7 receives the frame thinning signal from the disregarded frame deciding section 6. The data transmitting section 7 includes a switch or a gate which selectively transmits the intermediate video signal in response to the frame thinning signal. As shown in the portions (B), (E), and (F) of FIG. 12, the data transmitting section 7 enables the transmission of the intermediate video signal when the frame thinning signal is in the low-level state. On the other hand, the data transmitting section 7 inhibits the transmission of the intermediate video signal when the frame thinning signal is in the high-level state. Therefore, as shown in the portion (F) of FIG. 12, a frame is periodically deleted from successive frames represented by the output signal of the data transmitting section 7.

As shown in the portion (D) of FIG. 1, there periodically occur two successive frames (for example, the frames "1ab" and "1cb") regarding the intermediate video signal which originate from a same frame (for example, the frame "1") of the motion picture. In other words, a set of two successive duplicate frames periodically occur with respect to the intermediate video signal. As shown in the portions (D) and (E) of FIG. 1, the data transmitting section 7 disregards a former one (for example, the field "1ab") of two successive duplicate frames related to the first intermediate video signal and uses the latter one (for example, the field "1cb") of the two successive duplicate frames in the output signal thereof. In this way, the data transmitting section 7 thins out duplicate frames represented by the intermediate video signal. The output signal of the data transmitting section 7 (that is, the conversion-result video signal) has a picture rate corresponding to a frame frequency of 23.976 Hz.

It is preferable that the data transmitting section 7 executes a sub-sampling process for providing a necessary pixel number.

Advantages

As a result of the signal processing by the frame-frequency converting apparatus of this embodiment, four successive fields which originate from a common frame of a motion picture are prevented from occurring in connection with a video CD signal. Only three or less successive fields which originate from a common frame of a motion picture are permitted to occur in connection with a video CD signal. On the other hand, in a prior-art apparatus, there periodically occur four successive fields (two successive frames) regarding a video CD signal which originate from a same frame of a motion picture. Therefore, in comparison with the prior-art apparatus, the frame-frequency converting apparatus of this embodiment is effective to reduce jitter in motion of images reproduced by a video CD player.

According to the signal processing by the filtering and combining section 5, a pair of successive odd and even fields represented by the output signal of the editing point correcting section 4 are combined into a frame related to the output signal of the filtering and combining section 5. The combination of the two fields into the single frame provides noise reduction by about −3 dB.

If two fields which originate from different frames of a motion picture respectively are combined through vertical filtering upon an editing point, resultant image information tends to be poor in quality. The editing point correcting section 4 serves to remove such a problem. Specifically, in the case where the editing point correcting section 4 detects a scene change (an editing point), the editing point correcting section 4 changes an abnormal frame into a normal frame at a temporal place immediately following the scene change (the editing point). The change of the abnormal frame into the normal frame suppresses a picture-quality reduction upon the scene change.

What is claimed is:

1. A frame-frequency converting apparatus for an input video signal resulting from 2–3 conversion of original picture information, comprising:

means for rearranging fields represented by the input video signal, and thereby converting the input video signal into a rearrangement-resultant video signal, wherein every pair of an odd field and a subsequent even field represented by the rearrangement-resultant video signal originate from a same frame represented by the original picture information;

means for processing the rearrangement-resultant video signal into a combination-resultant video signal, and specifically combining every pair of an odd field and a subsequent even field represented by the rearrangement-resultant video signal into a frame represented by the combination-resultant video signal; and means for thinning out frames represented by the combination-resultant video signal, and thereby converting the combination-resultant video signal into a conversion-resultant video signal which has a predetermined frame frequency.

2. The frame-frequency converting apparatus of claim 1, further comprising:

means for detecting a change in a scene represented by the input video signal;

means for estimating an even field from an immediately preceding odd field represented by the rearrangement-resultant video signal through an interpolation process when the change in the scene is detected by the detecting means; and means for replacing an actual even field represented by the rearrangement-resultant video signal with the even field estimated by the estimating means.

* * * * *